(12) United States Patent
Nakajima et al.

(10) Patent No.: US 9,863,680 B2
(45) Date of Patent: Jan. 9, 2018

(54) HEAT PUMP APPARATUS

(71) Applicant: Mitsubishi Electric Corporation, Tokyo (JP)

(72) Inventors: Komei Nakajima, Tokyo (JP); Kosuke Tanaka, Tokyo (JP); Hiroaki Makino, Tokyo (JP); Kazuhide Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 14/431,402

(22) PCT Filed: Jun. 20, 2013

(86) PCT No.: PCT/JP2013/066913
§ 371 (c)(1),
(2) Date: Mar. 26, 2015

(87) PCT Pub. No.: WO2014/203364
PCT Pub. Date: Dec. 24, 2014

(65) Prior Publication Data
US 2015/0247660 A1 Sep. 3, 2015

(51) Int. Cl.
*F25B 1/00* (2006.01)
*F25B 49/02* (2006.01)
(Continued)

(52) U.S. Cl.
CPC ............ *F25B 49/02* (2013.01); *F24F 11/008* (2013.01); *F24F 11/0012* (2013.01);
(Continued)

(58) Field of Classification Search
None
See application file for complete search history.

(56) References Cited

U.S. PATENT DOCUMENTS 4,149,389 A * 4/1979 Hayes ................ F25B 7/00
62/114
2004/0200233 A1* 10/2004 Funakoshi ............... F25B 1/10
62/498
(Continued)

FOREIGN PATENT DOCUMENTS

CN 101487643 A 7/2009
EP 1 884 726 A2 2/2008
(Continued)

OTHER PUBLICATIONS

International Search Report of the International Searching Authority dated Sep. 17, 2013 for the corresponding international application No. PCT/JP2013/066913 (and English translation).
(Continued)

*Primary Examiner* — Etsub Berhanu
*Assistant Examiner* — Amanda P Setiawan
(74) *Attorney, Agent, or Firm* — Posz Law Group, PLC

(57) ABSTRACT

An apparatus includes a refrigerant circuit in which a compressor that compresses a refrigerant, an indoor-side heat exchanger serving as a radiator that exchanges heat between the refrigerant and a heating target, an expansion valve that decompresses the refrigerant by opening-degree adjustment, and an outdoor-side heat exchanger serving as an evaporator that exchanges heat between a heat-exchange target and the refrigerant are connected by pipes. The apparatus includes: an outdoor air temperature sensor that detects a temperature of outdoor air serving as the heat-exchange target; a discharge-side temperature sensor that detects a discharge temperature of the refrigerant discharged by the compressor; and a controller that, when the controller determines that a rotation speed of the compressor is a maximum and the temperature of the heat-exchange target is lower than a preset temperature, controls an opening degree of the expansion valve by using the discharge temperature.

6 Claims, 5 Drawing Sheets

(51) Int. Cl.
    *F25B 13/00*     (2006.01)
    *F24F 11/00*     (2006.01)
    *F25B 30/02*     (2006.01)
    *F25B 41/06*     (2006.01)

(52) U.S. Cl.
    CPC .............. *F25B 13/00* (2013.01); *F25B 30/02* (2013.01); *F25B 41/062* (2013.01); *F24F 2011/0013* (2013.01); *F24F 2011/0043* (2013.01); *F24F 2011/0045* (2013.01); *F25B 49/027* (2013.01); *F25B 2313/02741* (2013.01); *F25B 2313/0314* (2013.01); *F25B 2313/0315* (2013.01); *F25B 2341/063* (2013.01); *F25B 2600/2513* (2013.01); *F25B 2700/171* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01)

(56) References Cited

U.S. PATENT DOCUMENTS

2005/0284164 A1* 12/2005 Ohta ..................... F25B 49/02
                                                                          62/228.3
2007/0068178 A1* 3/2007 Honma ................... F25B 9/008
                                                                          62/160

FOREIGN PATENT DOCUMENTS

| | | |
|---|---|---|
| JP | S63-290354 A | 11/1988 |
| JP | H06-094954 A | 4/1994 |
| JP | 2001-221526 A | 8/2001 |
| JP | 2006-266592 A | 10/2006 |
| JP | 2007-198632 A | 8/2007 |
| JP | 2008-121977 A | 5/2008 |
| JP | 2010-060236 A | 3/2010 |
| JP | 2010-101621 A | 5/2010 |
| JP | 2010-164270 A | 7/2010 |
| JP | 2011-214736 A | 10/2011 |
| JP | 2012-013321 A | 1/2012 |
| WO | 2009/029506 A1 | 3/2009 |

OTHER PUBLICATIONS

Office Action dated Jan. 5, 2016 issued in corresponding JP patent application No. 2015-522427 (and English translation).
Office Action dated Mar. 3, 2016 issued in corresponding CN patent application No. 201380056021.9 (and English translation).
Extended European Search Report dated Sep. 22, 2016 issued in corresponding EP patent application No. 3887571.1.
Japanese Office Action dated Sep. 6, 2016 in the corresponding JP application No. 2015-522427. (English translation attached).
Chinese Office Action dated Sep. 9, 2016 in the corresponding CN application No. 201380056021.9. (English translation attached).

* cited by examiner

HEAT PUMP APPARATUS

CROSS REFERENCE TO RELATED APPLICATION

This application is a U.S. national stage application of PCT/JP2013/066913 filed on Jun. 20, 2013, the contents of which are incorporated herein by reference.

TECHNICAL FIELD

The present invention relates to a heat pump apparatus, such as an air-conditioning apparatus.

BACKGROUND

To heat or cool an object, there are heat pump apparatuses that convey heat by using refrigerants. An example of a heat pump apparatus is an air-conditioning apparatus, or the like. A typical heat-pump air-conditioning apparatus includes a compressor, a four-way valve, an outdoor-side heat exchanger, an expansion valve, and so forth in an outdoor unit. In addition, the heat-pump air-conditioning apparatus includes an indoor heat exchanger in an indoor unit. These component devices are connected via refrigerant pipes to form a refrigerant circuit.

In such an air-conditioning apparatus, an inverter device controls a driving frequency, that is, a rotation speed (driving frequency) of the compressor, in accordance with a frequency instruction from a controller (control device). At this time, signals from sensors (detection devices) that are provided on a suction side of the compressor and that detect a compressor inlet temperature, a saturation temperature, and the like are input to the controller. Then, the controller serving as a control device determines a degree of superheat in the refrigerant circuit from detected values of the sensors contained in the signals, and controls an opening degree of the expansion valve so that the degree of superheat becomes constant (for example, see Patent Literature 1).

The controller performs the control described above, a refrigerant in a two phase region in which a heat transfer rate of the refrigerant is high is thereby used effectively, and thus the air-conditioning apparatus can be operated efficiently.

PATENT LITERATURE

Patent Literature 1: Japanese Examined Patent Application Publication No. 6-94954

However, when heating operation is performed under low outdoor air temperature conditions, an evaporating pressure of the refrigerant is reduced, and thus a suction density of the compressor is reduced and a refrigerant flow rate is reduced. For this reason, heating capacity is reduced.

In typical control, in order to prevent a reduction in heating capacity, a compressor rotation speed is increased to increase the refrigerant flow rate. However, when the compressor is being driven at a maximum rotation speed, the rotation speed is not able to be increased further. For this reason, there is a problem in that capacity supply to a load is not able to be dealt with by rotation speed control of the compressor.

SUMMARY

In order to solve such a problem, a heat pump apparatus of the present invention includes a refrigerant circuit in which a compressor that compresses a refrigerant, a radiator that exchanges heat between the refrigerant and a heating target, a decompressor that decompresses the refrigerant by opening-degree adjustment, and an evaporator that exchanges heat between a heat-exchange target and the refrigerant are connected by pipes. The heat pump apparatus includes: a heat-exchange target temperature sensor that detects a temperature of the heat-exchange target; a discharge temperature sensor that detects a discharge temperature of the refrigerant discharged by the compressor; and a controller that, when determining that a rotation speed of the compressor is a maximum and the temperature of the heat-exchange target is lower than a preset temperature, controls an opening degree of the decompressor by using the discharge temperature.

According to the present invention, a controller performs, on the basis of a temperature of a heat-exchange target, opening-degree control of a decompressor based on a discharge temperature, and thus an air-conditioning apparatus that enables not only capacity enhancement performed by a compressor but also capacity enhancement performed by the opening-degree control can be obtained.

DETAILED DESCRIPTION

Embodiment 1

Figure 1:
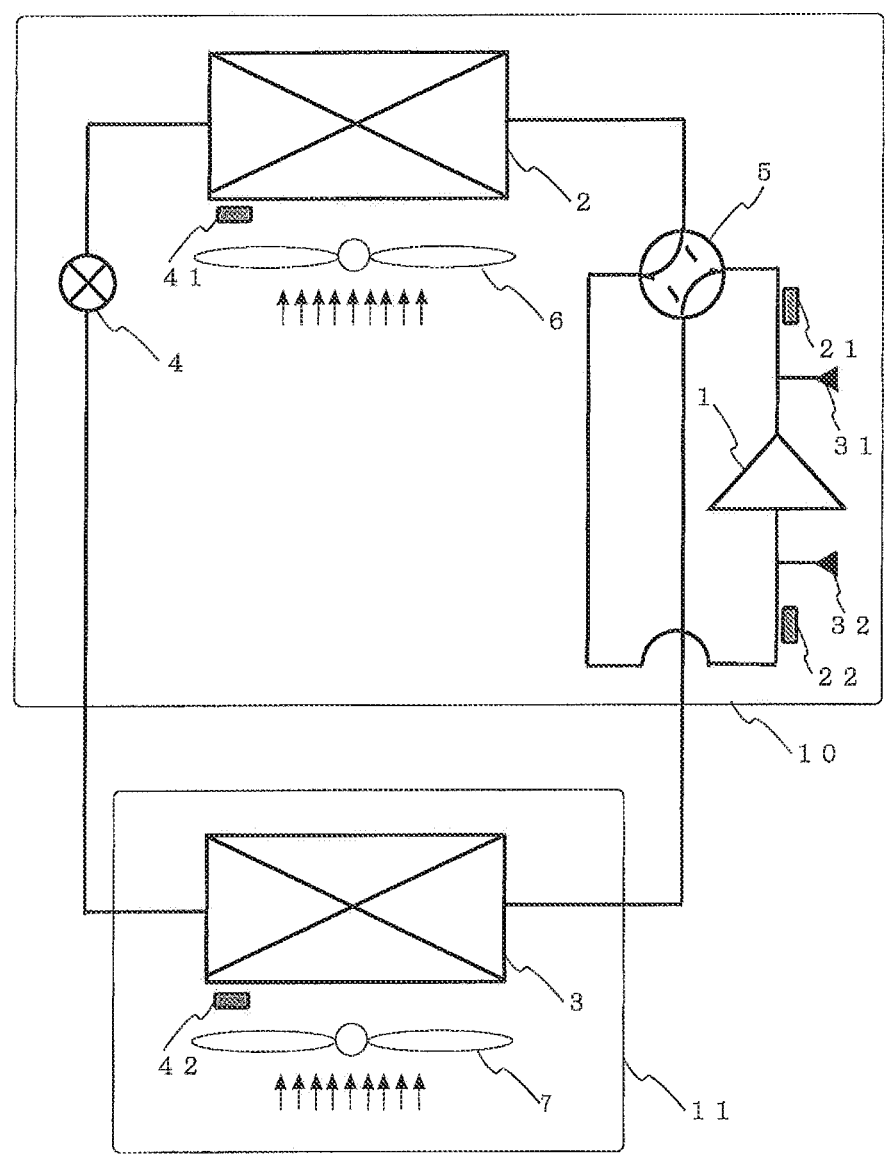
FIG. 1 illustrates the structure of an air-conditioning apparatus of Embodiment 1 according to the present invention.

Embodiment 1 of the present invention will be described in detail below with reference to the drawings. In figures, devices and the like denoted by the same reference numerals are identical or devices corresponding thereto, and this applies to the full text of the specification. Additionally, the forms of components described in the full text of the specification are merely illustrative, and the present invention is not limited to only the description in the specification. In addition, high and low levels of temperature, pressure, and the like are not determined in relation to a particular absolute value, but are relatively determined in accordance with a state or operation of a system, an apparatus, or the like. Furthermore, in the drawings, the dimensional relationships among component members may be different from the actual ones.

FIG. 1 illustrates the structure of an air-conditioning apparatus of Embodiment 1 according to the present invention. In Embodiment 1, the air-conditioning apparatus illustrated in FIG. 1 will be described as an example of a heat pump apparatus. The air-conditioning apparatus illustrated in FIG. 1 includes a refrigerant circuit (heat pump circuit) in which an outdoor unit 10 and an indoor unit 11 are connected by pipes and a refrigerant circulates. The outdoor unit 10 has a compressor 1, an outdoor-side heat exchanger 2, an expansion valve 4, and a four-way valve 5. In addition, the indoor unit 11 has an indoor heat exchanger 3.

The compressor 1 compresses the sucked refrigerant and discharges it. Here, the compressor 1 includes an inverter device or the like, and is capable of finely changing the capacity of the compressor 1 (the amount by which the refrigerant is discharged per unit time) by changing a rotation speed (driving frequency) to any rotation speed. The four-way valve 5 switches between flows of the refrigerant at the time of cooling operation and at the time of heating operation on the basis of an instruction from a controller 101 to be described.

The outdoor-side heat exchanger 2 exchanges heat between the refrigerant and the air outside a room (outdoor air). For example, at the time of heating operation, the outdoor-side heat exchanger 2 functions as an evaporator, exchanges heat between the low-pressure refrigerant flowing in from the indoor unit 11 and the outdoor air, and evaporates and vaporizes the refrigerant. In addition, at the time of cooling operation, the outdoor-side heat exchanger 2 functions as a radiator (including a condenser; the same applies hereinafter), and exchanges heat between the refrigerant which has flowed in from a four-way valve 5 side and which has been compressed in the compressor 1 and the outdoor air. At this time, the outdoor-side heat exchanger 2 causes the refrigerant to, for example, dissipate heat (it functions as a condenser here, and condenses and liquefies the refrigerant). An outdoor-side fan 6 causes the outdoor air to pass through the outdoor-side heat exchanger 2 so that heat exchange between the refrigerant and the outdoor air is performed efficiently. In the outdoor-side fan 6 as well, a rotation speed may be finely changed by changing an operating frequency of a fan motor to any operating frequency with an inverter device. The expansion valve 4 serving as a decompressor, for example, decompresses the refrigerant. The expansion valve 4 of Embodiment 1 is composed of an electronic expansion valve that adjusts a pressure, temperature, and the like of the refrigerant within, for example, the heat exchanger by changing an opening degree on the basis of an instruction from the controller 101 to be described.

On the other hand, in the indoor unit 11, the indoor heat exchanger 3 exchanges heat between the refrigerant and the air of an air-conditioned space (indoor air). For example, at the time of heating operation, the indoor heat exchanger 3 functions as a radiator, and exchanges heat between the refrigerant flowing in from an outdoor unit 10 side and the indoor air (it serves as a condenser here). At this time, the indoor heat exchanger 3 causes the refrigerant to, for example, dissipate heat and flow to the outdoor unit 10 side. On the other hand, at the time of cooling operation, the indoor heat exchanger 3 functions as an evaporator, for example, exchanges heat between the refrigerant brought into a low pressure state by the expansion valve 4 and the outdoor air, and causes the refrigerant to draw heat of the indoor, evaporate, vaporize, and flow to the outdoor unit 10 side. An indoor-side fan 7 causes the indoor air to pass through the indoor-side heat exchanger 3 so that heat exchange with the refrigerant is performed efficiently.

Next, sensors included in the air-conditioning apparatus will be described. The air-conditioning apparatus of Embodiment 1 has temperature sensors that detect a temperature of the refrigerant and pressure sensors that detect a pressure. A discharge-side temperature sensor 21 detects a refrigerant temperature on a discharge side of the compressor 1 (discharge temperature). A suction-side temperature sensor 22 detects a refrigerant temperature on a suction side of the compressor 1 (suction temperature), an outdoor air temperature sensor 41 detects an outdoor air temperature on a windward side of the outdoor-side heat exchanger 2, and an intake temperature sensor 42 detects an intake temperature on a windward side of the indoor heat exchanger 3 (indoor temperature). In addition, a discharge-side pressure sensor 31 detects a pressure of the refrigerant on the discharge side of the compressor 1. Then, a suction-side pressure sensor 32 detects a pressure of the refrigerant on the suction side of the compressor 1 (suction pressure). A degree of superheat of the refrigerant on the suction side of the compressor 1 (a refrigerant flowing-out side of the evaporator) can be determined by using a temperature and a pressure detected by the suction-side temperature sensor 22 and the suction-side pressure sensor 32. Here, the position of the suction-side pressure sensor 32 is not limited to the position illustrated in FIG. 1, and may be a position in a section from the four-way valve 5 to the suction side of the compressor 1. In addition, a condensing temperature of the air-conditioning apparatus can be determined by converting a pressure of the discharge-side pressure sensor 31 into a saturation temperature.

Figure 2:
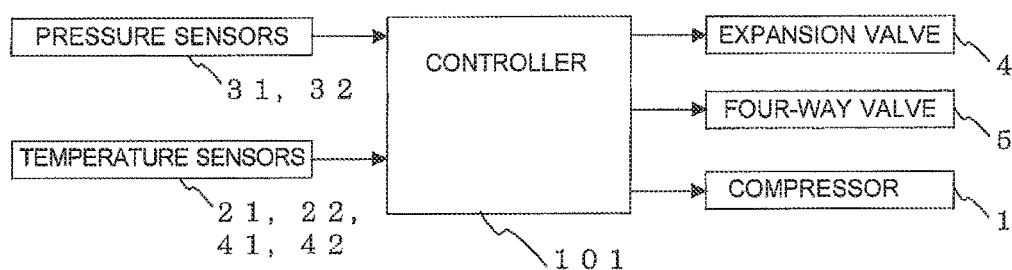
FIG. 2 illustrates a signal input-output relationship of a controller 101 according to Embodiment 1 of the present invention.

FIG. 2 illustrates a signal input-output relationship of the controller 101 according to Embodiment 1 of the present invention. Next, a communication system of the air-conditioning apparatus will be described. The controller 101 performs processing, such as computation, on the basis of signals sent from the above-mentioned sensors, and controls devices (actuators) included in the air-conditioning apparatus. Particularly, in Embodiment 1, an opening degree of the expansion valve 4 is controlled on the basis of signals from the sensors so that a degree of superheat of the refrigerant on the suction side of the compressor 1 or a temperature of the refrigerant discharged by the compressor 1 (discharge temperature) becomes constant. At this time, on the basis of an outdoor air temperature detected by the outdoor air temperature sensor 41, execution of control based on the degree of superheat (degree-of-superheat control) or execution of control based on the discharge temperature (discharge temperature control) is selected.

Next, operations performed in the air-conditioning apparatus of Embodiment 1 will be described on the basis of the flow of the refrigerant. First, heating operation will be described. In heating operation, the four-way valve 5 is switched so that a connection relationship denoted by a solid line is satisfied. The high-temperature and high-pressure gas refrigerant which has been compressed and discharged by the compressor 1 passes through the four-way valve 5 and flows from the outdoor unit 10. Then, it flows into the indoor unit 11.

In the indoor unit 11, the high-temperature and high-pressure gas refrigerant passes through the indoor heat exchanger 3. At this time, the refrigerant is condensed and liquefied by exchanging heat with the indoor air. The condensed and liquefied refrigerant (liquid refrigerant) flows from the indoor unit 11 and flows into the outdoor unit 10.

The refrigerant flowing into the outdoor unit 10 passes through the expansion valve 4. The refrigerant decompressed by the expansion valve 4 passes through the outdoor-side heat exchanger 2, and is evaporated and gasified by exchanging heat with the outdoor air. The evaporated and gasified refrigerant (gas refrigerant) passes through the four-way valve 5 and is sucked into the compressor 1 again. As described above, the refrigerant of the air-conditioning apparatus circulates, and thus air conditioning (heating) is performed.

Next, cooling operation will be described on the basis of the flow of the refrigerant. In cooling operation, the four-way valve 5 is switched so that a connection relationship denoted by a dashed line is satisfied. The high-temperature and high-pressure gas refrigerant which has been compressed and discharged by the compressor 1 passes through the four-way valve 5 and flows into the outdoor-side heat exchanger 2. Then, the refrigerant (liquid refrigerant) which has passed through the outdoor-side heat exchanger 2 and has been condensed and liquefied by exchanging heat with the outdoor air passes through the expansion valve 4. The refrigerant which has been decompressed by the expansion valve 4 and has come into a two-phase gas-liquid state flows from the outdoor unit 10.

The refrigerant flowing from the outdoor unit 10 passes through a pipe and flows into the indoor unit 11. Then, the refrigerant which has been decompressed by the expansion valve 4 and has come into the two-phase gas-liquid state flows into the indoor heat exchanger 3. The refrigerant (gas refrigerant) which has passed through the indoor heat exchanger 3 and has been evaporated and gasified by exchanging heat with the indoor air flows from the indoor unit 11.

The gas refrigerant flowing from the indoor unit 11 flows into the outdoor unit 10. Then it passes through the four-way valve 5 and is sucked into the compressor 1 again. As described above, the refrigerant of the air-conditioning apparatus circulates, and thus air conditioning (cooling) is performed.

The air-conditioning apparatus according to the present invention particularly exerts an effect at the time of heating operation, and a control operation and the like performed at the time of heating operation will therefore be described below.

First, the principle that efficient operation can be performed by controlling a degree of superheat will be described. In order to efficiently operate the air-conditioning apparatus, it is basically good to perform control so that a refrigerant enthalpy difference between a refrigerant inlet and a refrigerant outlet that are provided in the evaporator increases. However, when the refrigerant enthalpy difference increases excessively, a two-phase gas-liquid portion (two-phase portion) of the refrigerant in the evaporator is reduced, and a superheated gas (gas phase) portion increases. Heat-transfer performance of the superheated gas portion is lower than that of the two-phase portion, and heat-transfer performance in the entire evaporator is therefore reduced. Thus, in view of the heat-transfer performance in the evaporator, when control is performed so that the superheated gas portion in the evaporator is minimized, the air-conditioning apparatus can be operated efficiently.

For this purpose, in view of the two, the controller 101 determines a degree of superheat of the refrigerant on the basis of a suction temperature detected by the suction-side temperature sensor 22 and a saturation temperature obtained by performing conversion of a suction pressure detected by the suction-side pressure sensor 32. Then, an opening degree of the expansion valve 4 is controlled so that a quality becomes about 1.0 (a degree of superheat of 0 K). When such opening-degree control based on a degree of superheat is performed, heat exchange effectively using a two-phase region in which heat-transfer performance is high can be performed in the outdoor-side heat exchanger 2 serving as an evaporator, and thus the air-conditioning apparatus can be operated efficiently (hereinafter referred to as efficient operation).

Here, in view of detection accuracy of the suction-side temperature sensor 22 and the suction-side pressure sensor 32 serving as a saturation temperature sensor, it is difficult to practically perform control so that the degree of superheat becomes 0 K. Thus, the opening degree of the expansion valve 4 is controlled so that the degree of superheat does not become less than at least 0 K. For example, the expansion valve 4 is controlled so that the degree of superheat becomes a certain value of 3 K or higher. This enables control to be performed so that an actual degree of superheat becomes 0 K or higher even in the case where there is a difference of 3 K between a computed degree of superheat and the actual degree of superheat.

Next, the principle that capacity (heating capacity) is enhanced by controlling a discharge temperature will be described. Suppose that a refrigerant flow rate is G, a condenser inlet enthalpy of the refrigerant is h1, and a condenser outlet enthalpy is h2, capacity Qc can be represented by $Qc=G\times(h1-h2)$. In addition, suppose that a suction density is $\rho$, a compressor rotation speed is n, and a compressor stroke volume is Vst, the refrigerant flow rate G can be represented by $G=\rho\times n\times Vst$.

The above-mentioned efficient operation is operation in which a degree of superheat is controlled so that a quality x becomes 1.0. On the other hand, in order to enhance capacity, it is better to bring the refrigerant on the suction side into a wet state (the quality x is less than 1.0) (hereinafter, operation to enhance capacity is referred to as capacity operation).

Figure 3:
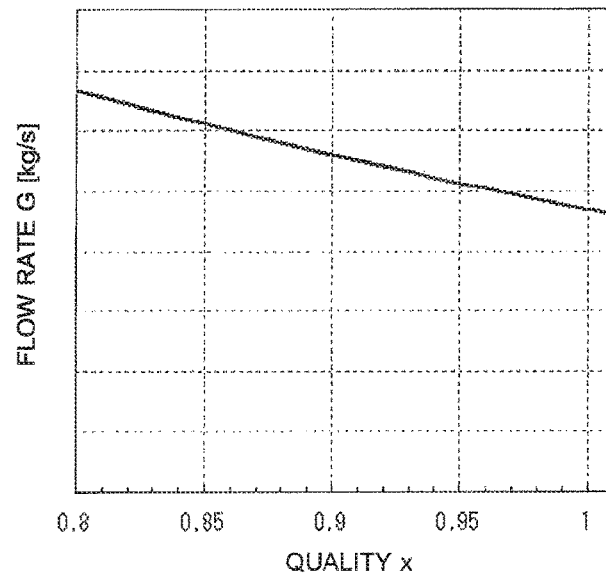
FIG. 3 illustrates a relationship between a quality x and a refrigerant flow rate G according to Embodiment 1 of the present invention.

FIG. 3 illustrates a relationship between a quality x and a refrigerant flow rate G according to Embodiment 1 of the present invention. When the quality x is reduced, the suction density $\rho$ increases. Thus, the refrigerant flow rate G increases.

Figure 4:
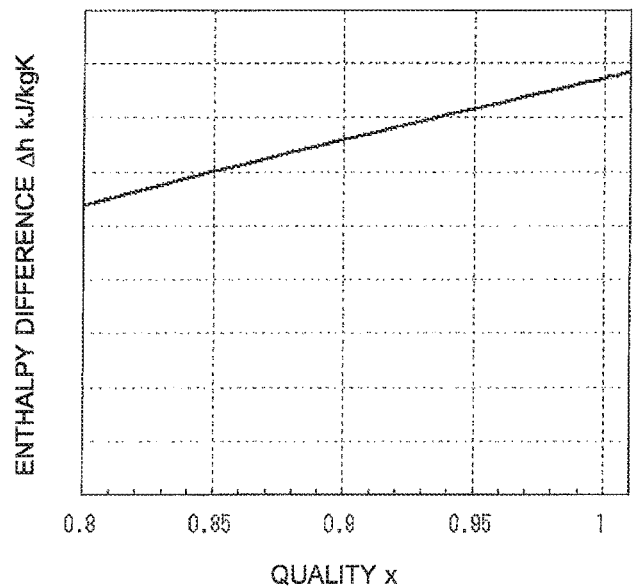
FIG. 4 illustrates a relationship between a quality x and an enthalpy difference $\Delta h$ according to Embodiment 1 of the present invention.

FIG. 4 illustrates a relationship between a quality x and an enthalpy difference $\Delta h$ according to Embodiment 1 of the present invention. In a compression process performed in the compressor 1 in which the refrigerant is in a wet state, the refrigerant is pressurized while undergoing an isentropic change, and a discharge temperature is therefore reduced. Thus, the enthalpy h1 at a refrigerant inlet of the condenser is reduced, and the enthalpy difference $\Delta h$ (=h1−h2) is reduced.

Figure 5:
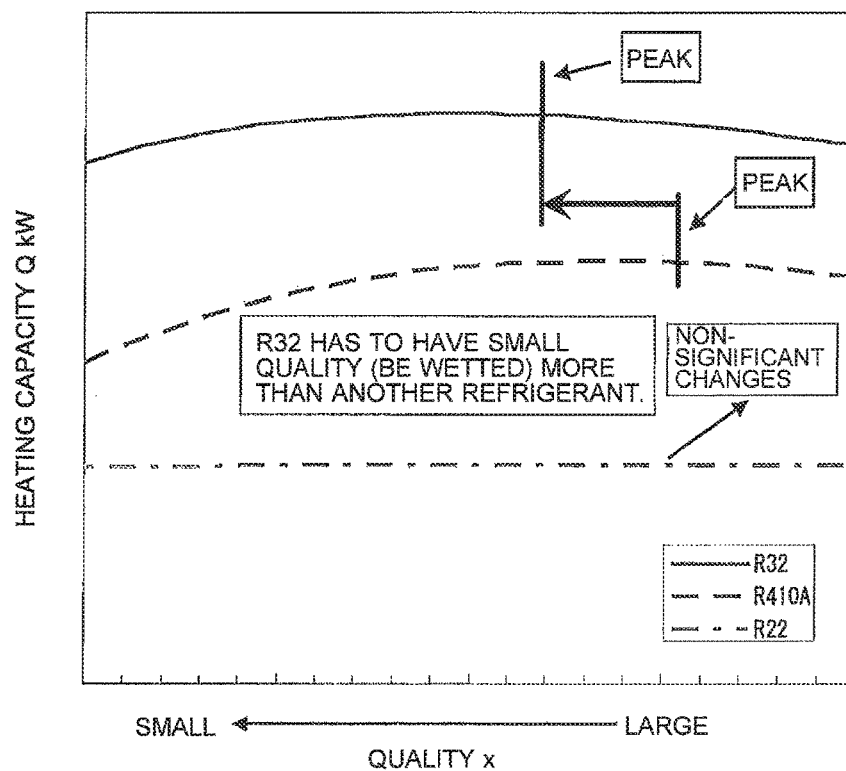
FIG. 5 illustrates a relationship between a quality x and capacity Qc according to Embodiment 1 of the present invention.

FIG. 5 illustrates a relationship between a quality x and capacity Qc according to Embodiment 1 of the present invention. As described above, when the refrigerant on the suction side of the compressor 1 is brought into a wet state, the refrigerant flow rate G increases, and the enthalpy difference $\Delta h$ (=h1−h2) is reduced. Thus, when the quality x is a certain value of 1.0 or less, the capacity Qc reaches its peak.

Hence, in the capacity operation, an opening degree of the expansion valve 4 is controlled so that the refrigerant on the suction side of the compressor 1 reaches the quality x at which capacity is maximized. Here, in the case where the refrigerant on the suction side of the compressor 1 is in a wet state, a difference between a refrigerant temperature on the suction side of the compressor 1 and a temperature of a refrigerant saturation gas is small, and a degree of superheat is not able to be determined. For this reason, degree-of-superheat control is not able to be performed.

For example, suppose that the refrigerant in the compression process performed in the compressor 1 undergoes an isentropic change, a state of the refrigerant on the suction side of the compressor 1 can be determined from a discharge temperature, a condensing temperature, and an evaporating temperature. Because the condensing temperature and the evaporating temperature depend on an indoor temperature and an outdoor air temperature, the state of the refrigerant on the suction side changes depending on the discharge temperature. Thus, the discharge temperature of the compressor 1 can be controlled by the opening degree of the expansion valve 4, and also the quality x on the suction side of the compressor 1 can be controlled.

Hence, the capacity operation can be performed by controlling the discharge temperature of the refrigerant discharged by the compressor 1. Here, a discharge temperature at which capacity is maximized is defined as a target discharge temperature set by the controller 101. Because the discharge temperature at which capacity is maximized differs depending on an outdoor air temperature, the target discharge temperature in discharge temperature control differs depending on an outdoor air temperature.

Figure 6:
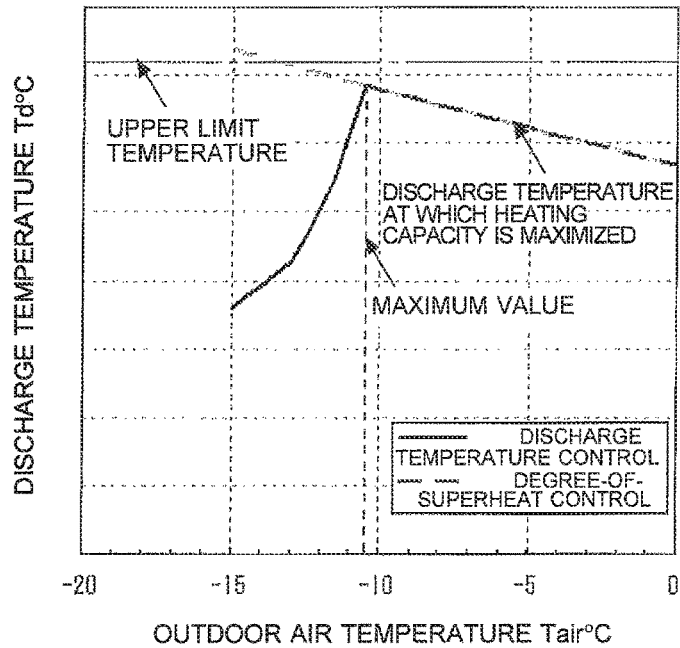
FIG. 6 illustrates a relationship between an outdoor air temperature and a target discharge temperature of the refrigerant according to Embodiment 1 of the present invention.

FIG. 6 illustrates a relationship between an outdoor air temperature and a target discharge temperature of the refrigerant according to Embodiment 1 of the present invention. As illustrated in FIG. 6, as the outdoor air temperature decreases, a discharge temperature (target discharge temperature) at which capacity is maximized increases; however, when the discharge temperature reaches its peak at a certain temperature (maximum value) and passes the peak, it is reduced as the outdoor air temperature decreases.

Figure 7:
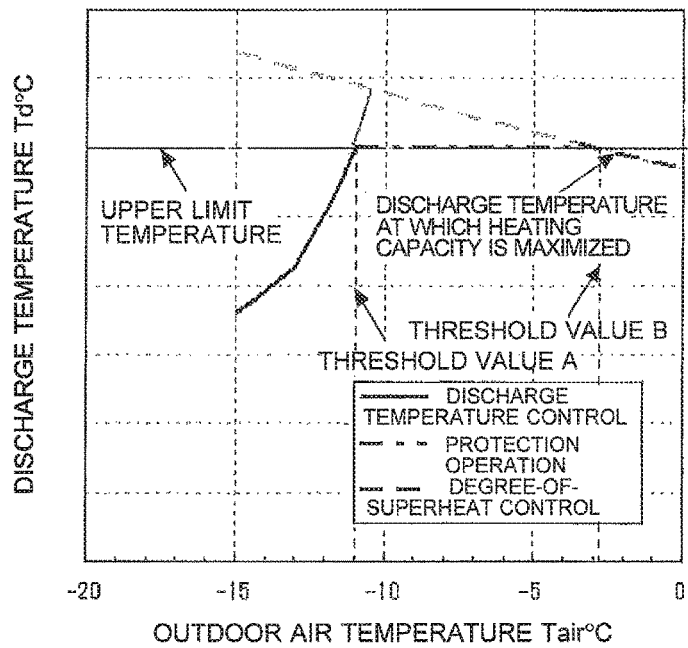
FIG. 7 illustrates a relationship between an outdoor air temperature and a target discharge temperature of the refrigerant exhibited in the case where protection operation is performed according to Embodiment 1 of the present invention.

FIG. 7 illustrates a relationship between an outdoor air temperature and a target discharge temperature of the refrigerant exhibited in the case where protection operation is performed according to Embodiment 1 of the present invention. For example, in order to protect the refrigerant, pipes, and so forth, it is good not to exceed an upper limit temperature in some cases. However, in some refrigerants and the like, there is an outdoor air temperature region (range) in which a discharge temperature at which capacity is maximized is the upper limit temperature or higher. For this reason, in the case where discharge temperature control is performed in this region, operation (protection operation) in which the upper limit temperature is not exceeded is performed. In FIG. 7, a threshold value A and a threshold value B respectively denote a lower limit value and an upper limit value in a region (range) in which a discharge temperature at which capacity is maximized is the upper limit temperature or higher. Here, in the case where the upper limit temperature is higher than the discharge temperature at the maximum value in FIG. 6, there is not a region in which the discharge temperature at which capacity is maximized is the upper limit temperature or higher, and thus the protection operation does not have to be performed.

Figure 8:
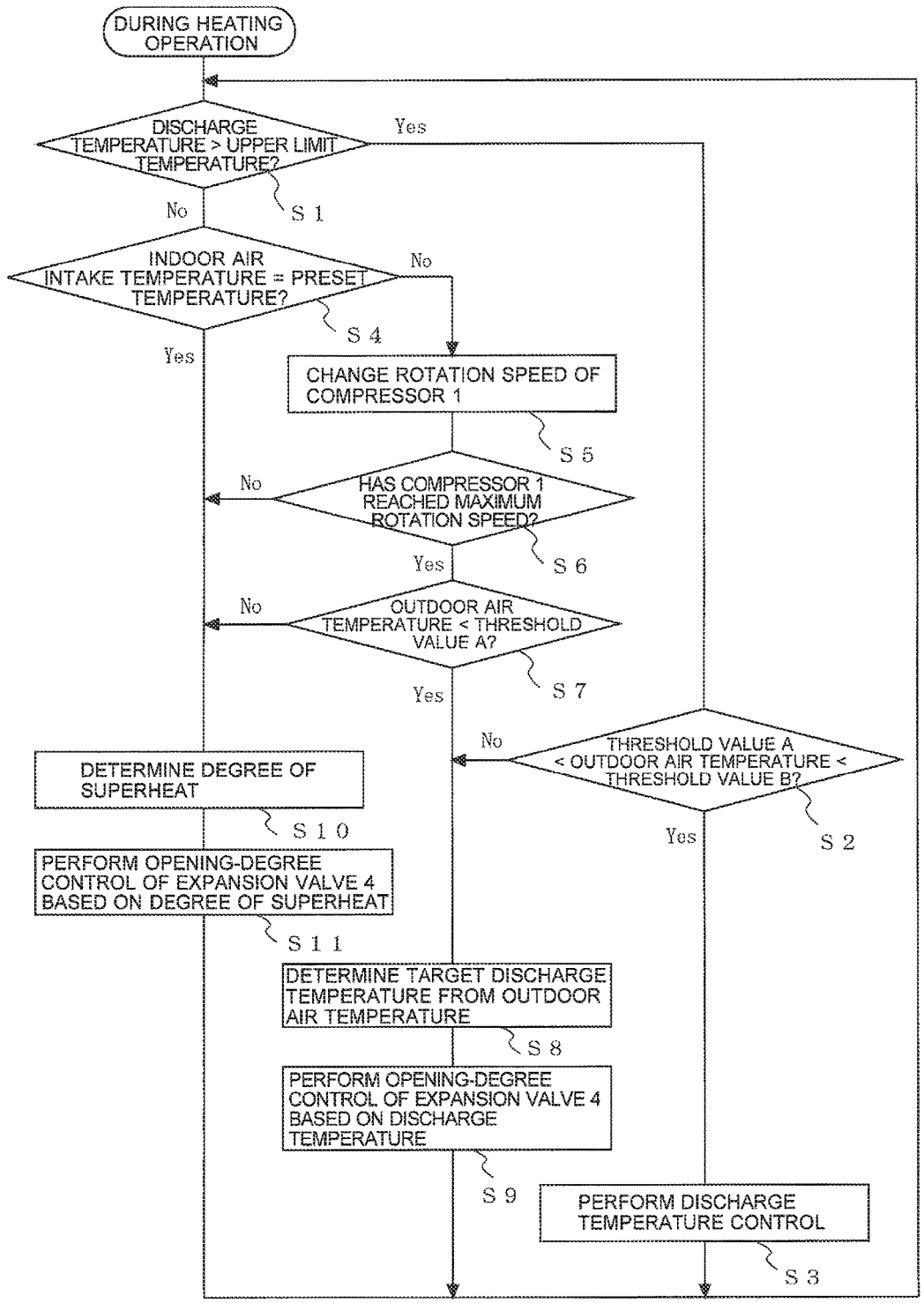
FIG. 8 is a flowchart illustrating control performed by the controller 101 according to Embodiment 1 of the present invention.

FIG. 8 is a flowchart illustrating control performed by the controller 101 according to Embodiment 1 of the present invention. In the air-conditioning apparatus of Embodiment 1, the controller 101 selects the efficient operation or the capacity operation to be performed, and performs control.

First, on the basis of detection of the discharge-side temperature sensor 21, it is determined whether or not a discharge temperature is higher than an upper limit temperature set in the air-conditioning apparatus (S1). When it is determined that the discharge temperature is higher than the upper limit temperature, an outdoor air temperature is compared with a threshold value A and a threshold value B, and it is determined whether or not the outdoor air temperature is higher than the threshold value A and lower than the threshold value B (A<outdoor air temperature<B) (S2). When it is determined that the outdoor air temperature is higher than the threshold value A and lower than the threshold value B, the upper limit temperature is set as a target discharge temperature, and discharge temperature control, such as control of an opening degree of the expansion valve 4, a rotation speed of the compressor 1, and the like is performed so as to reduce the discharge temperature (S3).

In addition, as illustrated in FIG. 7, when the outdoor air temperature is not higher than the threshold value A or not lower than the threshold value B, capacity can be enhanced even at a discharge temperature lower than the upper limit temperature. Thus, when it is determined that the outdoor air temperature is not higher than the threshold value A or not lower than the threshold value B (the outdoor air temperature is lower than or equal to the threshold value A or higher than or equal to the threshold value B) in S2, a discharge temperature at which capacity is maximized is set as a target discharge temperature on the basis of the outdoor air temperature (S8). Then, an opening degree of the expansion valve 4 is controlled by controlling the expansion valve 4 so that a discharge temperature (a temperature detected by the discharge-side temperature sensor 21) becomes the target discharge temperature (S9), and thus capacity enhancement operation is performed.

On the other hand, when it is determined that the discharge temperature is not higher than the upper limit temperature (the discharge temperature is the upper limit temperature or lower) in S1, it is determined, on the basis of an intake temperature detected by the intake temperature sensor 42, whether or not a temperature of an air-conditioned space is a temperature set by a user (a preset temperature) (S4). When it is determined that the temperature of the air-conditioned space is the preset temperature, capacity does not have to be enhanced, a degree of superheat is therefore determined (S10), an opening degree of the expansion valve 4 is controlled (S11), and thus efficient operation is performed.

In addition, when it is determined that the temperature of the air-conditioned space is not the preset temperature, a rotation speed of the compressor 1 is changed (S5). At this time, in the case where the temperature of the air-conditioned space is lower than the preset temperature, the rotation speed of the compressor 1 is increased. In the case where the temperature of the air-conditioned space is higher than the preset temperature, the rotation speed of the compressor 1 is reduced.

Subsequently, it is determined whether or not the rotation speed changed in the compressor 1 is a set maximum rotation speed (S6). When it is determined that the changed rotation speed is not maximized rotation speed, there is room for a rotation speed of the compressor 1 to enhance capacity. Hence, a degree of superheat is determined (S10), an opening degree of the expansion valve 4 is controlled (S11), and thus efficient operation is performed (capacity enhancement performed by opening-degree control of the expansion valve 4 is not performed).

On the other hand, when it is determined that the compressor 1 has reached the maximum rotation speed, an outdoor air temperature is compared with the threshold value A, and it is determined whether or not the outdoor air temperature is lower than the threshold value A (S7). Here, as illustrated in FIG. 6, in the case where a discharge temperature at which capacity is maximized is not higher than the upper limit temperature, the threshold value A is the maximum value.

When it is determined that the outdoor air temperature is not lower than the threshold value A (the outdoor air temperature is the threshold value A or higher), a degree of superheat is determined (S10), an opening degree of the expansion valve 4 is controlled (S11), and thus efficient operation is performed. When it is determined that the outdoor air temperature is lower than the threshold value A, a discharge temperature at which capacity is maximized is set as a target discharge temperature on the basis of the outdoor air temperature (S8). Then, control is performed by controlling the expansion valve 4 so that a discharge temperature becomes the target discharge temperature (S9).

As described above, according to the air-conditioning apparatus of Embodiment 1, in opening-degree control of the expansion valve 4, the controller 101 can select, on the basis of a temperature of outdoor air, which is a heat-exchange target in the outdoor-side heat exchanger 2 serving as an evaporator, capacity enhancement operation based on a discharge temperature instead of efficient operation based on a degree of superheat, and thus control can be performed so as to satisfy both of capacity enhancement corresponding to a load and efficiency of operation. At this time, capacity of the apparatus can be further enhanced by reducing a target discharge temperature on the basis of a low outdoor air temperature. For example, when the compressor 1 has reached a maximum rotation speed but capacity is required, when a temperature is lower than an outdoor air temperature at which a discharge temperature at which capacity is maximized reaches a maximum value, when capacity is reduced, and when a degree of superheat is not able to be detected, the capacity enhancement operation based on a discharge temperature is effective. On the other hand, when capacity can be provided, or when capacity can be provided by even control that is not control based on a discharge temperature, control based on a degree of superheat is performed, and the efficient operation can thereby be performed. In addition, in an outdoor air temperature region in which a discharge temperature at which capacity is maximized is an upper limit temperature or higher, a target discharge temperature is set to the upper limit temperature, and thus operation can be performed while protecting the compressor 1, the refrigerant, and so forth.

Here, for example, as illustrated in FIG. 6, in the case where the refrigerant is R32, in order to maximize capacity, it is good to reduce a discharge temperature from the compressor 1 and bring the refrigerant on the suction side of the compressor 1 into a wet state. For example, in comparison with a refrigerant, such as R410A, whose specific heat ratio is smaller than that of R32, an effect of enhancing capacity can be exerted effectively.

Embodiment 2

In Embodiment 1 described above, the air-conditioning apparatus has been described as an example, but this is not particularly limitative. For example, The present invention is also applicable to another heat pump apparatus, such as a hot-water storage apparatus, that causes an outdoor heat exchanger side to function as an evaporator.

In addition, in Embodiment 1, in the outdoor-side heat exchanger 2 serving as an evaporator at the time of heating operation, heat exchange between the refrigerant and outdoor air is performed; alternatively, another fluid (such as water) or the like may serve as a heat-exchange target that exchanges heat with the refrigerant. At this time, the outdoor air temperature sensor 41 serves as a heat-exchange target temperature sensor that detects a temperature of the fluid or the like serving as the heat-exchange target.

The invention claimed is:

1. A heat pump apparatus including a refrigerant circuit in which a compressor that compresses a refrigerant, a radiator that exchanges heat between the refrigerant and a heating target, a decompressor that decompresses the refrigerant by opening-degree adjustment, and an evaporator that exchanges heat with a heat-exchange target and the refrigerant are connected by pipes, the heat pump apparatus comprising:
    a heat-exchange target temperature sensor that detects a temperature of the heat-exchange target;
    a discharge temperature sensor that detects a discharge temperature of the refrigerant discharged by the compressor; and
    a controller configured to:
        determine a rotation speed of the compressor, and
        determine a degree of superheat of the refrigerant, and
        in response to determining that the rotation speed of the compressor is a maximum and the temperature of the heat-exchange target is lower than a preset temperature,
        control an opening degree of the decompressor by using the discharge temperature, and
        in response to determining that the rotation speed of the compressor is not maximized or that the temperature of the heat-exchange target is the preset temperature or higher,
        control the opening degree of the decompressor by using the degree of superheat of the refrigerant.

2. The heat pump apparatus of claim 1, wherein the preset temperature is set to be a maximum value of the discharge temperature at which capacity of the heat pump apparatus is maximized.

3. The heat pump apparatus of claim 1, wherein, in response to the discharge temperature being higher than or equal to a predetermined upper limit temperature, and
    the capacity of the heat pump apparatus being maximized for a temperature of the heat exchange target,
    the controller sets the upper limit temperature as a target discharge temperature and performs control based on the detected discharge temperature and the target discharge temperature.

4. The heat pump apparatus of claim 1, wherein the refrigerant is R32.

5. The heat pump apparatus of claim 1, further comprising:
    a suction-side temperature sensor configured to detect a suction-side temperature of the refrigerant on a suction side of the compressor;
    a suction-side pressure sensor configured to detect a suction-side pressure of the refrigerant on the suction side of the compressor,
    wherein the degree of superheat is determined based on the suction-side temperature and the suction-side pressure.

6. The heat pump apparatus of claim 1, wherein the controller is further configured to set the preset temperature.

* * * * *